United States Patent [19]
Williams

[11] 4,044,483
[45] Aug. 30, 1977

[54] DISPLAY DEVICE AND METHOD OF MAKING SAME
[76] Inventor: Cole C. Williams, 2408 Allanjay Place, Glendale, Calif. 91208
[21] Appl. No.: 637,297
[22] Filed: Dec. 3, 1975
[51] Int. Cl.² .............................................. G09F 1/12
[52] U.S. Cl. .................................... 40/152; 40/152.1
[58] Field of Search .................. 40/152, 158 R, 152.1, 40/159, 155, 156; 24/81

[56] References Cited

U.S. PATENT DOCUMENTS

| 1,807,288 | 5/1931 | Herbert | 40/152.1 |
| 1,913,609 | 6/1933 | Morny | 40/152.1 |

FOREIGN PATENT DOCUMENTS

| 1,096,066 | 12/1960 | Germany | 40/158 R |
| 227,355 | 10/1910 | Germany | 40/152 |

Primary Examiner—Louis G. Mancene
Assistant Examiner—Mickey Yu
Attorney, Agent, or Firm—James E. Brunton

[57] ABSTRACT

A display device for displaying art works such as photographs, drawings and the like, consisting of two or more sheets of clear glass hingeably interconnected by a novel resilient hinge arrangement. The device may be used for displaying photographs or like works in which case the novel hinge arrangement enables the work to be securely held fixedly in position between contiguous sheets of glass, and facilitates quick changing of the art work.

Alternately, art forms may be imprinted directly onto the surfaces of the display device in which case the hinge mechanism permits the sheets of glass to be oriented in a manner best suited for displaying the particular art form and enables positioning of the device in a freestanding upright orientation.

4 Claims, 9 Drawing Figures

DISPLAY DEVICE AND METHOD OF MAKING SAME

BACKGROUND OF THE INVENTION

1. Field of the Invention

The present invention relates generally to display devices, and more particularly, to quick-change display devices for displaying photographs and other artistic works.

2. Discussion of the Prior Art

The prior art is replete with quick-change picture mounts or frames of various designs. Typically, these prior art devices comprise a rear wall, or supporting surface, a transparent pane of glass of the same general shape and size as the rear wall, and some type of resilient frame or clip arrangement adapted to hold the glass pane in engagement with the rear wall.

In one group of prior art devices, the frame itself removably holds the pane of glass against the supporting surface. In such devices, the frame is typically constructed of a yieldable resilient material and is configured so that it may be deformed in a manner to permit separation of the glass pane from the rear wall, thus enabling changing of the artwork being displayed.

Another group or class of prior art quick-change picture mounts embodies clips or wire spring devices adapted to be pushed over the glass pane and rear wall to hold the parts together and clamp the artwork therebetween.

All of these prior art devices have various drawbacks. In the picture mounts having clips or hooks, it is often difficult for an unskilled person to effectively manipulate the locking clips. Further, with this type of frame, the glass panes can be easily damaged by the clips unless they are carefully bent away from the glass panes. In the class of picture mounts using yieldable frames to position the glass pane against the rear supporting wall, removal of the pane to change the artwork is often quite cumbersome. Additionally, since the glass can easily be broken, its removal from the deformable frame can be dangerous for the unskilled person. A further disadvantage of both the frame and clip-type quick-change picture mounts is the rather unpleasant appearance of the devices owing to the necessary structural configuration of the clips or yieldable frames.

The various drawbacks of the quick-change picture mounts have been totally eliminated in the device of the present invention. No clips or perimeter frame is involved. Rather, the display device uniquely comprises two sheets of glass interconnected in a highly novel manner by an almost invisible hinge mechanism formed of a tough but resilient bonding material. This arrangement provides, in effect, a borderless mount which is not only attractive, but highly functional, permitting the safe and expeditious quick change of artwork without the necessity of manipulating any kind of clip, frame, or the like.

The following prior art patents, which represent the most pertinent art known to applicant, clearly demonstrate the novelty of the present invention:

| Ward | 3,798,815 | Billet, et al. | 2,749,634 |
| Lumley | 2,184,893 | Lieberman | 3,069,795 |
| Smith, et al. | 2,281,054 | Conrad | 3,711,978 |
| Sury | 3,349,443 | Rochelt | 3,654,719 |
| Bruck, Jr. | 3,541,714 | Rochelt | 3,727,335 |

SUMMARY OF THE INVENTION

It is an object of the present invention to provide a novel display device for displaying artwork such as photographs, drawings, and the like, which utilizes no clips, mechanical fasteners, or perimeter frame, and which permits the expeditious change of artwork by unskilled persons without the use of tools and without the necessity of cumbersome manipulation of the frame.

More particularly, it is an object of the invention to provide a display device of the aforementioned character in which the artwork is removably clamped between two sheets of glass which are hingeably interconnected in a unique manner thereby enabling ready removal and exchange of the artwork being displayed.

It is another object of the invention to provide a display device of the type described in the preceding paragraphs in which the resilient hinge mechanism of the device is virtually invisible to the viewer and permits the sheets of glass to be swingably moved from a normally closed position wherein the artwork is clamped therebetween into an open position wherein the sheets of glass are in a substantially coplanar relationship.

It is still another object of the invention to provide a display device of the class described in which the resilient hinge mechanism is virtually fatigue-free, will not fail even after repeated flexing, and will not deteriorate when exposed to normal room atmospheres.

It is another object of the invention to provide a display device which comprises two or more sheets of glass swingably interconnected by a novel resilient hinge mechanism in a manner so as to present a novel surface arrangement upon which artistic designs and the like can be imprinted.

It is still another object of the invention to provide a display device of the character described in the preceding paragraph in which the interconnected sheets of glass can be swingably adjusted relative to one another in a manner so that the device may be positioned in a freestanding upright display position whereby the imprinted design can be uniquely exhibited.

It is a further object of the invention to provide a display device as described which is highly versatile, attractive and durable, and one which can be easily and inexpensively manufactured and conveniently packaged for shipment.

Another object of the invention is to provide a unique method of making the display device of the invention which requires a minimum of tooling and can be readily performed with unskilled labor.

In summary, the foregoing objects of the invention are achieved by a display device comprising first and second planar members, each having opposing front and back parallel faces and at least one substantially straight side portion; and a hinge mechanism for hingeably interconnecting the first and second planar members along substantially the entire length of the straight edge portions thereof, the hinge mechanism comprising a room temperature vulcanizing bonding material bonded to the straight side portions of the planar members.

DESCRIPTION OF THE PREFERRED EMBODIMENTS

Figure 1:
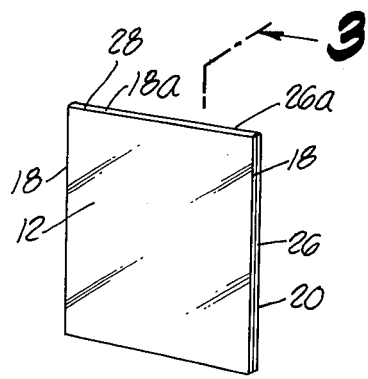
FIG. 1 is a perspective view of one form of the display device of the invention showing the appearance of the device in a closed position.
Figure 2:
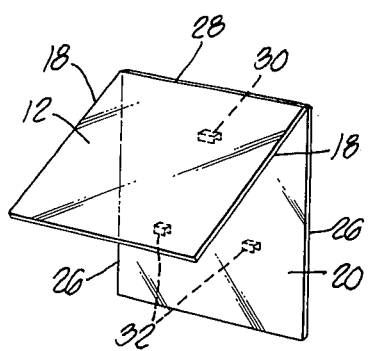
FIG. 2 is a perspective view of one form of the display device showing the appearance of the device in a partially open position.
Figure 3:
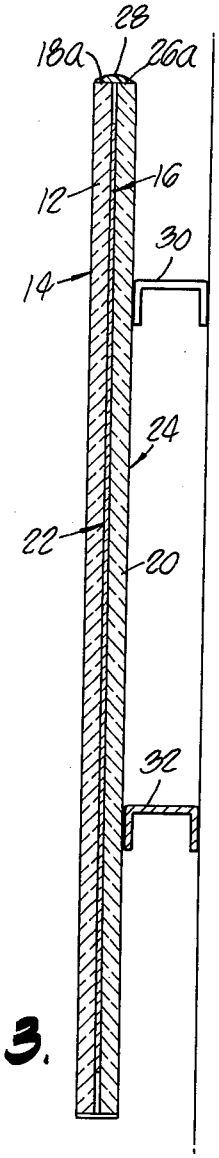
FIG. 3 is an enlarged cross-sectional view taken along lines 3—3 of FIG. 1 showing the frame as it would appear when hung on a wall.

Referring to the drawings, and more particularly to FIGS. 1, 2 and 3, one form of the display device of the invention is illustrated. In this form of the invention, the display device consists of a quick-change borderless frame for displaying photographs and other forms of artwork adapted to be hung on a wall, or the like. As best seen in FIG. 3, this frame includes a first planar member, shown here as a sheet of glass 12, having opposing front and back parallel faces 14 and 16 respectively. The frame of this form of the invention is shown as being generally rectangular in shape with the first sheet of glass having substantially straight sides 18 disposed within planes generally perpendicular to the plane of faces 14 and 16. The frame could, of course, be constructed from various transparent materials in a variety of shapes, such as triangular, hexagonal, octagonal, or the like. A second planar member, shown here as a sheet of glass 20, is provided to form a backing or support member for the artwork. Sheet 20 also has front and back parallel faces 22 and 24 respectively, and substantially straight sides 26 disposed within planes generally perpendicular to the plane of faces 22 and 24.

Hinge means generally designated in the drawings by the numeral 28 is provided for hingeably interconnecting the first and second sheet of glass 12 and 20. In the embodiment of the invention shown in FIGS. 1-6, hinge means 28 comprises a bead of room temperature vulcanizing bonding material which is bonded to the upper side or top portions 18a and 26a of sheets of glass 12 and 20 respectively. Although various types of resilient bonding materials can be used to form the hinge means, room temperature vulcanizing silicone rubber bonding material has proven highly satisfactory. More particularly, a silicone rubber bonding material manufactured by SWS Silicones, Division of Stauffer Chemical Company, and designated SWS-951, has been found to be very well-suited for forming the hinge means of the invention.

Figure 4:
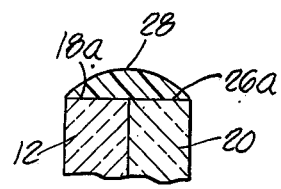
FIG. 4 is a greatly enlarged cross-sectional view illustrating the configuration of the hinge mechanism of the invention as it appears when the display device is in a closed position.

As best seen by referring to FIG. 4, the hinge means 28 of the invention is generally semicircular in cross-section when the frame is in its closed position, wherein the backface 16 of first member 12 is in engagement with the front face 22 of second member 20. As best seen by referring to FIGS. 2-8 of the drawings, the novel hinge means of the invention permits the first and second members to be swingably moved relative to each other from the closed position of FIGS. 3 and 4 to the partially open position of FIGS. 2 and 5, and finally, to the fully open position shown in FIGS. 6 and 8. In this fully open position, the faces of the members are substantially coplanar. It is this highly novel feature of the invention which contributes to the great versatility of use of the frame.

Referring particularly to FIGS. 2 and 3, it is apparent that the frame of this form of the invention can be hung on a wall by placing upper support bracket 30, which is affixed as by bonding to the back of member 20, over a nail or other suitable member protruding outwardly from the wall. Bracket 30 is shown as generally U-shaped in cross-section to facilitate hanging the frame. Similarly shaped brackets 32 are affixed to the back of member 20 nearer the bottom edge thereof. These brackets are adapted to contact the wall so as to uniformly space the frame therefrom, thereby enabling the frame to be disposed in a generally parallel relationship with respect to the wall.

Figure 7:
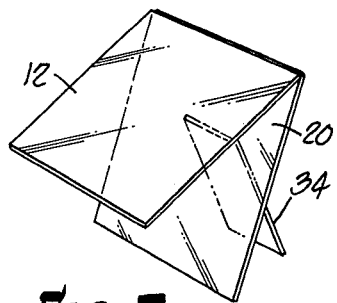
FIG. 7 is a perspective view of another form of the display device of the invention which is adapted to rest upon a flat surface.

In FIG. 7 there is shown another form of the frame of the invention which is adapted to rest upon a flat surface such as a desk top or the like. In this embodiment, a support member 34 is swingably connected to the back of member 20 and functions to support the frame in a generally upright position. Member 34 can be hingeably connected to member 20 by using the previously identified silicone rubber material, thereby enabling it to be folded flat against member 20 for shipment without damaging the hinge connection.

Figure 8:
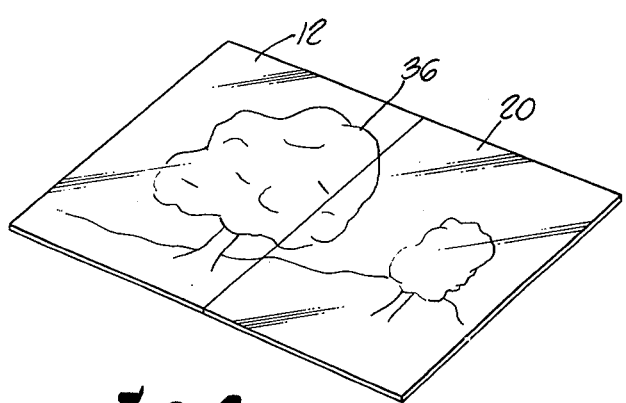
FIG. 8 is a perspective view of still another form of the invention wherein an artistic design is imprinted upon the display surfaces of the device.
Figure 9:
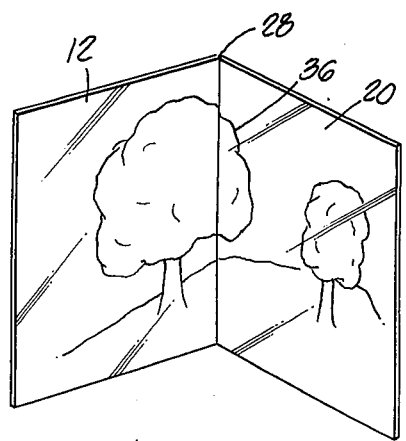
FIG. 9 is a view similar to FIG. 8, but showing the appearance of the display device of this form of the invention as it appears in a freestanding upright display position.

In FIGS. 8 and 9 there is shown yet another embodiment of the invention. In this form, decorative indicia 36, such as artwork of various kinds, is imprinted directly onto the flat surfaces of the first and second members 12 and 20. This indicia can be imprinted on the surfaces by many techniques, including silk screening. The novel hinge means, as previously described, enables the frame to be positioned in various flat or freestanding configurations as depicted in FIGS. 8 and 9 so as to best display the artform. Also, if desired the durability and flexibility of the hinge means enables the art form to be imprinted onto the frame members after they are joined together. In this way, the juncture of the frame members can be effectively used to create novel and unusual visual effects in the over-all appearance of the art form.

It is to be appreciated that although only two interconnected members or sheets of glass are shown in the drawings, several members can be joined together in various ways using the novel hinge means of the invention. This feature enables the creation of many types of highly attractive displays. For example, when several sheets are used, the device can be arranged for display in the form of a star or other geometric design, and yet still be packaged or stored in a generally flat configuration.

Figure 5:
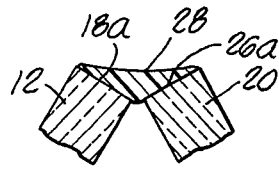
FIG. 5 is a view similar to FIG. 4, but showing the appearance of the hinge mechanism when the display device is in a partially open position.
Figure 6:
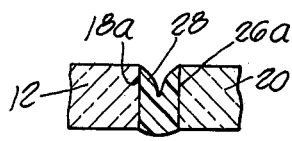
FIG. 6 is a view similar to FIG. 5, but showing the appearance of the hinge mechanism when the display device is fully open with the first and second planar members thereof in a substantially coplanar relationship.

The method of the present invention involves hingeably interconnecting two or more planar members, each of which is characterized by having opposing front and back faces and at least one substantially straight edge interconnecting the face. More particularly, the method of the present invention comprises the following steps.

a. Cleaning the planar members to remove surface contaminants therefrom. The cleaning step of the invention is of significant importance to achieve proper formation and bonding of the hinge means of the invention, which means interconnects the planar members. Various cleaning solvents can be used, depending upon the nature of the material from which the planar members are formed. When the planar members are glass, cleaning may be accomplished by washing the members with a soap and water solution, followed by a thorough rinsing of all surfaces of the members with deionized water.

b. Securely clamping the planar members together with the faces thereof in intimate engagement and the straight edges thereof aligned and disposed in a coplanar relationship. The orientation of the planar members for this step of the method is as illustrated in FIGS. 3 and 4 of the drawings. The planar members may be clamped together by any suitable means such as spring clamps or other types of pressure members. In order that the hinge means of the invention be properly formed, it is essential that the two planar members be securely clamped in an intimate relationship. Otherwise, the bead of silicone rubber which forms the hinge means will not properly form and will not properly bridge the juncture between the two members where the edges or the straight sides meet.

c. With the planar members securely clamped together, the last step of the method of the invention comprises uniformly depositing an integral bead of resilient bonding material, such as room temperature vulcanizing silicone rubber, along substantially the entire length of the straight side portions of the planar members so that the bead overlaps the juncture between the members in the manner shown in FIG. 4 of the drawings. As previously pointed out, various types of bonding material can be used, but a silicone rubber bonding material manufactured by SWS Silicones, Division of Stauffer Chemical Company, and designated SWS-951, has been found to be very well suited for forming the hinge means. For certain applications, the straight sides of the planar members may be ground or beveled. For best results, however, the straight sides of the planar members are disposed within planes substantially perpendicular to the faces of the members. With members of this configuration, during the step of forming the hinge means the planar members are clamped together so that the straight sides thereof are in a coplanar relationship as illustrated in FIG. 4. The bonding material or silicone rubber can be applied to the straight sides of the planar members by any suitable means. In practice, however, it has been determined that best results are obtained if the material is deposited onto the edges of the planar members using a syringe adapted to apply a uniform and controllable amount of bonding material along substantially the entire length of the straight edges of the members. When the material is thus applied to the edges of the planar members, it will form into a bead generally semicircular in cross-section as illustrated in FIG. 4. This configuration has been found to provide maximum strength and durability in use. As illustrated in FIGS. 5 and 6 of the drawings, during the opening and closing of the frame, the configuration of the hinge means changes drastically. Using the silicone rubber previously identified and depositing the bonding material in the aforementioned manner, it has been found that the hinge means will satisfactorily withstand a very large number of flexings from the closed position shown in FIG. 4 to the fully opened position shown in FIG. 6.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A frame for displaying photographs and the like comprising:
   a. a first sheet of glass having opposing front and back parallel faces and at least one substantially straight side disposed within a plane generally perpendicular to the plane of said faces;
   b. a second sheet of glass having opposing front and back parallel faces and at least one substantially straight side disposed within a plane generally perpendicular to the plane of said faces; and
   c. hinge means for hingeably interconnecting said first and second sheets of glass along said straight sides thereof so that said first and second sheets are movable from a closed position wherein said back face of said first sheet of glass is in engagement with said front face of said second sheet of glass into an open position wherein said first and second sheets of glass are in a substantially coplanar relationship, said hinge means comprising a room temperature vulcanizing silicone rubber bonding material bonded to said straight sides of said first and second sheets of glass to hingeably interconnect said sheets of glass, said bonding material being in the form of a yieldably deformable bead which is generally semicircular in cross-section when said sheets are in a closed position and is resiliently deformable into a configuration wherein said bead is disposed intermediate said straight sides of said sheets of glass when said sheets of glass are in an open coplanar position.

2. A freestanding hingeably interconnected display device for displaying decorative indicia and the like comprising:
   a. a first sheet of glass having opposing front and back parallel faces and at least one substantially straight side disposed within a plane generally perpendicular to the plane of said faces, at least one of said faces having indicia imprinted thereon;
   b. a second sheet of glass having opposing front and back parallel faces and at least one substantially straight side disposed within a plane generally perpendicular to the plane of said faces, at least one of said faces having indicia imprinted thereon; and
   c. hinge means for hingeably interconnecting said first and second sheets of glass along said straight sides thereof said hinge means comprising a rubber bonding material bonded to said straight sides of said first and second sheets of glass whereby said sheets of glass are swingably movable relative to each other about said hinge means from a closed position wherein said back face of said first sheet is in engagement with said front face of said second sheet into an open position wherein said faces of said sheets are substantially coplanar.

3. A display device as defined in claim 2 in which said bonding material is a room temperature vulcanizing silicone adhesively affixed to said straight sides of said sheets of glass in the form of a yieldably deformable bead which is generally semicircular in cross-section when said sheets are in a closed position and is resiliently deformable when said sheets are in an open coplanar position into a configuration wherein said bead is disposed intermediate said straight sides of said sheets of glass.

4. A display device as defined in claim 3 in which said first and second sheets of glass are substantially rectangularly shaped.

* * * * *